United States Patent [19]

Whichard

[11] Patent Number: 4,542,068
[45] Date of Patent: Sep. 17, 1985

[54] METHOD OF MAKING GLASS FIBER MAT

[75] Inventor: Matthew C. Whichard, Morris Plains, N.J.

[73] Assignee: GAF Corporation, Wayne, N.J.

[21] Appl. No.: 611,576

[22] Filed: May 18, 1984

[51] Int. Cl.$^4$ .................. D21F 11/00; D21H 5/18
[52] U.S. Cl. ..................... 428/290; 428/288; 162/156; 162/158; 162/166; 162/184; 156/296
[58] Field of Search .............. 156/62.2, 308.6, 296; 252/8.8; 428/297, 273, 288, 289, 290; 427/384, 389.8, 407.3; 162/156, 158, 184, 166

[56] References Cited

U.S. PATENT DOCUMENTS 4,178,203  12/1979  Chakrabarti ................... 162/156
4,179,331  12/1979  Chakrabarti ................... 162/156
4,200,487  4/1980   Bondac et al. .............. 162/156 X
4,242,404  12/1980  Bondac et al. .............. 162/156 X
4,269,886  5/1981   Bondac ........................ 428/288 X
4,430,158  2/1984   Jackey et al. ................ 162/156
4,457,785  7/1984   Hsu et al. .................... 106/308 N Primary Examiner—Edward Kimlin
Assistant Examiner—Ramon R. Hoch
Attorney, Agent, or Firm—Joshua J. Ward

[57] ABSTRACT

Method of making glass fiber mat of improved tensile strength by forming the mat from a plurality of glass fibers and a binder composition therefor which consists essentially of a urea-formaldehyde resin and alkoxylated alkyl amine surfactant.

5 Claims, No Drawings

METHOD OF MAKING GLASS FIBER MAT

BACKGROUND OF THE INVENTION

Glass fiber mats are composed of glass fibers held together by a binder material. Typical binders used in the industry are urea-formaldehyde resins, phenolic resins, polyvinyl alcohols, and latexes. These binder materials are coated directly on the fibers of the mat and set or cured to provide the desired integrity for the glass fibers. The most widely used binder is urea-formaldehyde because it is inexpensive. Unfortunately, urea-formaldehyde binder is deficient in one or more respects for glass fiber mats. In particular, the tensile strengths of mats bound with urea-formaldehyde may deteriorate appreciably when the mats are subjected to wet conditions, such as normally encountered by incorporating such mats in roofing products. Such products may fail if wet tensile strength is much lower than dry tensile strength.

U.S. Pat. No. 4,430,158 teaches the addition of certain anionic surfactants to urea-formaldehyde binder as a means of improving wet tensile strength of glass fiber mats.

U.S. Pat. No. 4,178,203 to Chakrabarti teaches addition of surfactants to newly formed wet glass mat to improve the wet strength of the newly formed mat so that it does not fall apart while being transferred to subsequent operations such as application of binder. The Chakrabarti process does not result in any significant improvement in the tensile strength of the finished mat.

It is an object of this invention to provide glass fiber mat of improved tensile strength for use in manufacturing products such as roofing shingles and built-up roofing products.

SUMMARY OF THE INVENTION

The invention comprises a method of making glass fiber mat having improved tensile strength properties comprising:

(a) forming a wet mat of a plurality of enmeshed, sized glass fibers in a wet-laid process;

(b) coating the fibers of said wet mat with a binder composition consisting essentially of urea-formaldehyde and alkoxylated alkyl amine of the formula

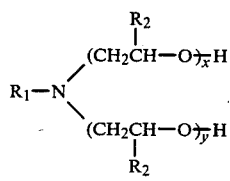

wherein $R_1$ is an alkyl group containing from 8 to about 30 carbon atoms, each $R_2$ is independently H or $CH_3$, and $x+y$ is an integer from 2 to about 50; and (c) drying the glass mat having the binder thereon.

The process of forming glass fiber mats according to the invention generally begins with chopped bundles of sized glass fibers of suitable length and diameter. Generally, fibers having a length of about 6 to 75 millimeters and a diameter of about 3 to 20 micrometers are used. Each bundle may contain from about 20 to 300, or more, of such fibers, which may be wet or dry, as long as they can be suitably dispersed in an aqueous dispersant medium. The bundles are added to the dispersant medium to form an aqueous slurry. Any suitable dispersant known in the art may be used. The fiber slurry then is agitated to form a workable dispersion at a suitable consistency. The dispersion then is passed to the screen of a mat-forming machine. Enroute to the screen, the dispersion usually is diluted with water to a lower fiber concentration.

The fibers are collected at the wire screen in the form of a wet fiber mat and the excess water is removed by vacuum in the usual manner. The wet mat now is ready for application of the binder composition thereto. This is generally accomplished by soaking the mat in an excess of binder solution to insure complete coating of fibers and removing excess binder under vacuum. The mat then is dried and the binder composition is cured preferably in an oven at elevated temperatures of at least at about 200° C. Alternatively, but less desirable, catalytic curing may be used, such as with an acid catalyst, e.g. ammonium chloride or p-toluene sulfonic acid.

The binder composition of the invention is prepared by blending a urea-formaldehyde resin with alkoxylated alkyl amine having the general formula

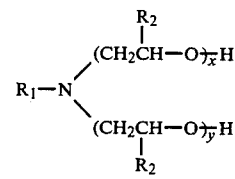

wherein $R_1$ represents an alkyl group containing from 8 to about 30 atoms, each $R_2$ is independently H or $CH_3$ and $x+y$ is an integer from 2 to about 50. Amines or mixtures of amines of this type in which $R_1$ represents an alkyl group containing between about 12 and about 20 carbon atoms and in which $x+y$ equals an integer between 2 and about 10 are preferred. Use of alkyl amine in amounts of between about 0.01 and about 5 weight percent (wt%) based on total binder is preferred.

Alkoxylated alkyl amines of the general type used in the invention and their preparation are described in detail in U.S. Pat. No. 4,339,343 the disclosure of which is incorporated herein by reference. Such amines can for instance be prepared by reacting the appropriate primary fatty amine or mixture of fatty amines with ethylene oxide and/or propylene oxide. Ethylene or propylene oxide is usually used in amounts between about 2 and about 30 moles of ethylene oxide or propylene oxide per molar proportion of fatty amine. Suitable fatty amines include for instance oleyl amine, stearyl amine, octylamine, dodecylamine, hexadecylamine, decenylamine, tetradecenylamine, octadecenylamine and mixtures thereof such as cocoamine (typically a mixture of about 2 wt% decylamine, 53 wt% dodecylamine, 24 wt% tetradecylamine, 11 wt% hexadecylamine, 5 wt % octadecylamine, and 5 wt % octadecenylamine), soyamine (typically a mixture of about 11.5 wt% hexadecylamine, 4 wt% octadecylamine, 24.5 wt % oleylamine, 53 wt % linoleylamine, and 7 wt % linolenylamine); and tallow amine (typically a mixture of about 4 wt % tetradecylamine, 29 wt % hexadecylamine, 20 wt % octadecylamine, and 47 wt % octadecenylamine). Further illustrative of suitable starting fatty amines are the halogenated fatty amines, particularly the chlorinated and brominated fatty amines, which illustratively can be made by the chlorination or bromination of cocoamine, soyamine, tallow amine, and the like. Tallow amine mixtures are especially preferred.

The urea-formaldehyde resins of the binder composition are commercially available materials; for example, urea-formaldehyde resins such as 2921 sold by Georgia-Pacific, and "PR-350", sold by Borden Chemical, may be used. These resins generally are modified with methylol groups which upon curing form methylene or ether linkages. Such methylols may include N,N'-dimethylol; dihydroxymethylolethylene; N,N'-bis(methoxymethyl), N,N'-dimethylolpropylene; 5,5-dimethyl-N,N'-dimethylolpropylene; N,N'-dimethylolethylene and the like.

The following examples are intended to illustrate the invention without limiting the scope thereof.

EXAMPLE 1

In order to evaluate the effectiveness of various surfactants in improving tensile strength of wet laid glass mat, various surfactants were added to urea-formaldehyde binder used in making wet laid glass mats which were made and tested as described herein. Each mat was made by dispersing 7.2 g of 32 mm length OCF 670 M glass fibers in 12 liters of a 200 ppm solution of dimethylhydrogenated tallow amine oxide, at 0.06 wt% consistency. The dispersion was then diluted to 0.015% consistency enroute to a dewatering screen where a wet web was formed. The wet web then was dipped into an aqueous binder solution of urea-formaldehyde (20% solids by weight). Except for the control (run #1) the binder solution in each case contained surfactant of the type and amount (based on total binder) indicated in Table I below. Thereafter excess binder was removed by vacuum and the mat was dried. The basis weight of the mat was about 110 grams per square meter, the caliper was 1.0 mm and the binder constituted about 23% by weight of the mat.

Each glass mat was then tested for tensile strength under dry conditions (dry tensile) and after thorough soaking in water for 10 minutes at 25° C. The tensile strengths were tested using mat specimens 50 mm×200 mm in the machine direction (MD). The results were recorded as newtons per 50 millimeters for the average of 5 samples. The samples had a tear strength of about 7N. The results are given in Table I below.

The urea-formaldehyde resin used for these runs was Georgia-Pacific 2921.

The surfactants used are identified as follows:

1. Katapol ®PN-430 surfactant supplied by GAF Corporation. This was ethoxylated tallow amine having the structure

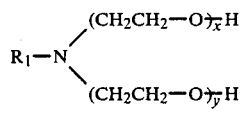

where $x+y=5$ and $R_1$ is a mixture of alkyl groups averaging about 18 carbon atoms.

2. Katapol ®PN-730 surfactant supplied by GAF Corporation. This was also ethoxylated tallow amine of the same structure as Katapol ®PN-430 except that $x+y=15$.

3. Katapol ®PN-530 surfactant supplied by GAF Corporation. This was also ethoxylated tallow amine of the same structure as Katapol ®PN-430 except that $x+y=9$.

TABLE I

RETENTION OF TENSILE STRENGTH

| Run No. | Surfactant Used Type | Amount (Wt %) | Dry Tensile Strength (N/50 mm) | Wet Tensile Strength (25° C.) (N/50 mm) | % Retention of Dry Tensile Strength |
|---|---|---|---|---|---|
| 1 | None | 0 | 230 | 45 | 20 |
| 2 | Katapol ® PN-530 | 0.03 | 300 | 119 | 40 |
| 3 | Katapol ® PN-430 | 0.15 | 333 | 151 | 45 |
| 4 | Katapol ® PN-730 | 0.15 | 318 | 141 | 44 |

While the invention has been described above with respect to preferred embodiments thereof, it will be understood by those skilled in the art that various changes and modifications may be made without departing from the spirit or scope of the invention.

What is claimed is:

1. A method of making glass fiber mat having improved tensile strength properties comprising:
   (a) forming a wet mat of a plurality of enmeshed, sized glass fibers in a wetlaid process;
   (b) coating the fibers of said wet mat with a binder composition consisting essentially of urea-formaldehyde and alkoxylated alkyl amine of the formula

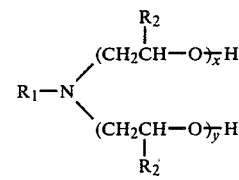

wherein $R_1$ is an alkyl group containing from 8 to about 30 carbon atoms, each $R_2$ is independently H or $CH_3$, and $x+y$ is an integer from 2 to about 50; and
   (c) drying the glass mat having the binder thereon.

2. A method according to claim 1 wherein said surfactant is present in an amount of about 0.01 to about 5% by weight of the binder.

3. Method according to claim 1 wherein, in the formula for the alkoxylated amine, $R_1$ represents an alkyl group containing between about 12 and about 20 carbon atoms and $x+y$ equals an integer between 2 and about 10.

4. Glass fiber mat made according to the method of claim 1.

5. Glass fiber mat made according to the method of claim 3.